United States Patent
Deng et al.

(10) Patent No.: US 6,567,414 B2
(45) Date of Patent: *May 20, 2003

(54) METHOD AND APPARATUS FOR EXITING A DEADLOCK CONDITION

(75) Inventors: Feng Deng, San Jose, CA (US); James P. Kardach, Saratoga, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,051

(22) Filed: Oct. 30, 1998

(65) Prior Publication Data

US 2003/0053468 A1 Mar. 20, 2003

(51) Int. Cl.⁷ .............................................. H04L 12/28
(52) U.S. Cl. ..................... 370/402; 370/419; 710/306
(58) Field of Search .......................... 710/5, 128, 315, 710/306; 711/118; 370/402, 401, 403, 419, 451, 463

(56) References Cited

U.S. PATENT DOCUMENTS 5,790,831 A * 8/1998 Lin et al. ..................... 710/315
5,938,739 A * 8/1999 Collins et al. ................. 710/5
6,035,362 A * 3/2000 Goodrum et al. ........... 710/128

* cited by examiner

Primary Examiner—Hassan Kizou
Assistant Examiner—John Pezzlo
(74) Attorney, Agent, or Firm—Blakely, Sokoloff, Taylor & Zafman LLP (57) ABSTRACT

A bridge for communicating between a first and a second bus includes a first interface unit, a second interface unit and a buffer unit. The first interface unit is adapted to be coupled to the first bus. The second interface unit is adapted to be coupled to the second bus. The buffer unit is coupled to the first and second interface units. The buffer unit is adapted to receive a posted transaction from one of the first and second interface units. The buffer unit includes a posting buffer and a discard timer. The posting buffer is adapted to store the posted transaction. The discard timer is adapted to generate a discard timer expired signal after a predetermined time interval that the posted transaction has resided in the posting buffer. A method for exiting from a potential deadlock situation includes posting a transaction, tracking the length of time the transaction has been posted, and discarding the transaction after a predetermined time interval that the transaction has been posted.

22 Claims, 7 Drawing Sheets

METHOD AND APPARATUS FOR EXITING A DEADLOCK CONDITION

BACKGROUND OF THE INVENTION

1. Field of the Invention

This invention relates generally to the communication between devices over bus and more particularly, to the control of a posted instruction over a bridge to exit from a deadlock condition.

2. Description of the Related Art

A computer system typically includes a number of devices that communicate over a "bus." Bus communications within a computer system are governed by predetermined protocols. One such bus transfer protocol is the peripheral component interconnect (PCI) bus specification (PCI specification, Revision 2.1, published by the PCI Special Interest Group of Portland, Oreg.). Protocols such as the PCI specification include rules directed to preventing conflicting transactions, i.e., read and write operations, from being issued and locking up the bus, otherwise known as "deadlock." Rules designed to prevent deadlock conditions are called deadlock avoidance rules.

Many computer systems are equipped with multiple buses to spread out the electrical load or the processing load. In such systems, a "bridge" couples a first bus to a second bus. The system may have multiple bridges depending on the number of buses in the system. In general, a bridge identifies a transaction initiated by a device on one of the buses with an address associated with a device on the other bus to which the bridge is coupled. The bridge transfers the command and any data associated with the transaction to the destination bus.

One transaction used in bus communication is a write command, which allows one of the components to write data to an address associated with another of the devices. When a device desires to write to another device, it arbitrates for ownership of the bus to which it is coupled and becomes the bus master. Once the device becomes the bus master, it issues the write command. When the write command is issued, the first device maintains ownership of the bus until the write command is completed.

In the case where the destination address of the write command is associated with a device connected to a bus other than the bus to which the initiating device is coupled, the command and data must first be transferred to the second bus before it can be completed. When the command is transferred to the destination bus, the bridge becomes the bus master of the destination bus and issues the write command to the second device. In this simplified example, the write command would not be completed until after the second device has accepted the write, and the bridge has sent an acknowledgment of the write back to the first device. Such an arrangement is inefficient in that the first device would maintain ownership of its associated bus until the second device accepted the write.

To improve the efficiency of writes across a bridge, a bridge may contain a posted write buffer. This buffer latches the command and data and allows the initiating device to complete the write when the data is latched in the posted write buffer. The bridge then assumes responsibility for ensuring the completion of the write command. This allows the first bus to be released for further transactions while the bridge ensures completion of the write. To prevent deadlock related to posted writes, certain deadlock avoidance rules are necessary.

A potential problem may arise when the first device or another device initiates a read from the target of the posted write before the data is actually written to the target device. If this read were allowed to complete, the device initiating the read would not receive the freshest copy of the data stored at the target address. In order to prevent this undesirable situation, the bridge must flush all of the posted write buffer writes to their respective targets before a read is permitted on the bus containing the targeted devices. One way to ensure that a posted write buffer has been cleared is to initiate a read command from the target device. This will force the flushing of all posted write buffers that reside in bridges between the device requesting the read and the target device before the read is permitted to complete.

A problem exists with the posted write buffer system described above when, for some reason (e.g., device failure, software error), the target cannot complete the posted write transaction. Because the presence of data in the posted write buffer prevents commands such as read commands from being completed, the failure of the target to accept the posted write causes a deadlock condition. If the condition in the target device preventing it from accepting the posted write persists, the deadlock will prevent proper operation of the computer system resulting in the need for reset.

The present invention is directed to overcoming, or at least reducing the effects of, one or more of the problems set forth above by preventing the inability of a target device to complete a posted write from causing an unrecoverable deadlock condition.

SUMMARY OF THE INVENTION

In one aspect of the present invention, an bridge is provided for communicating between a first and a second bus. The bridge includes a first interface unit, a second interface unit and a buffer unit. The first interface unit is adapted to be coupled to the first bus. The second interface unit is adapted to be coupled to the second bus. The buffer unit is coupled to the first and second interface units. The buffer unit is adapted to receive a posted transaction from one of the first and second interface units. The buffer unit includes a posting buffer and a discard timer. The posting buffer is adapted to store the posted transaction. The discard timer is adapted to generate a discard timer expired signal after a predetermined time interval that the posted transaction has resided in the posting buffer.

In a second aspect of the present invention, a method is provided for exiting from a potential deadlock situation. The method includes posting a transaction, tracking the length of time the transaction has been posted, and discarding the transaction after a predetermined time interval that the transaction has been posted.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
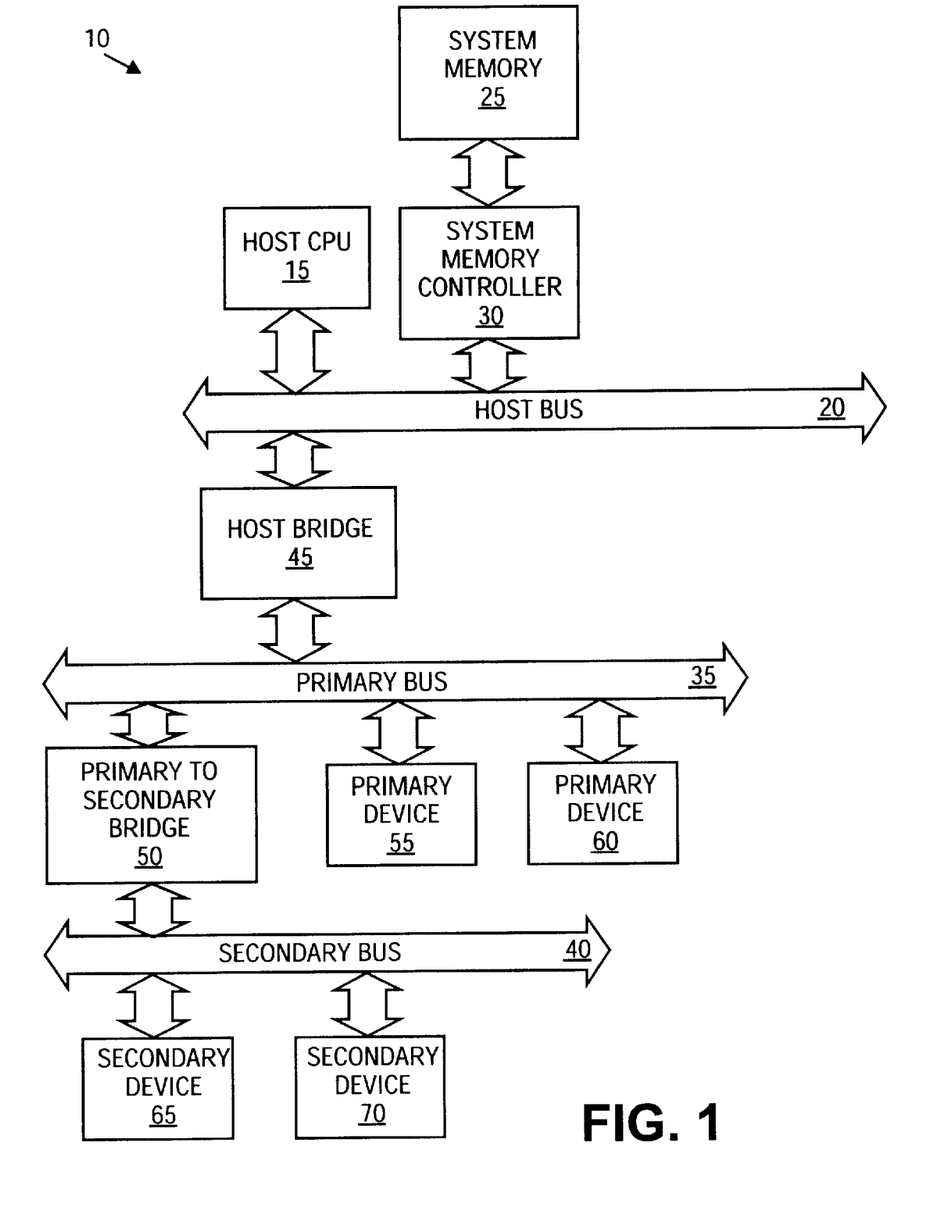
FIG. 1 is a block diagram of one embodiment of a computer system in accord with the present invention.

Referring to FIG. 1, a block diagram of portions of a computer system 10 is provided. The computer system 10 includes a host central processing unit (CPU) 15 coupled to a host bus 20. The CPU 15 communicates with a system memory 25 through a system memory controller 30. The system memory controller 30 is also coupled to the host bus 20. The computer system 10 also includes a primary bus 35 and a secondary bus 40. The host bus 20 is coupled to the primary bus 35 by a host bridge 45, and the primary bus 35 is coupled to the secondary bus 40 by a primary to secondary bridge 50.

Primary devices 55, 60 are coupled to the primary bus 35, and secondary devices 65, 70 are connected to the secondary bus 40. Except as indicated below, the components of the computer system 10 are intended to represent a broad category of these components widely available in the art. In the illustrated embodiment, the primary and secondary buses are peripheral component interconnect ("PCI") buses (PCI specification, Revision 2.1, published by the PCI Special Interest Group of Portland, Oreg.). However, it is contemplated that the invention may be employed using any bus topology or protocol. In the case where PCI buses are used as the primary and secondary buses 35, 40, the host bridge 45 may be referred to by those in the art as a host to PCI bridge, and the primary to secondary bridge 50 may be referred to as a PCI to PCI bridge.

Each component coupled to the buses 20, 35, 40 has a unique address space. The CPU 15 can issue a command to any of the other components (e.g., system memory controller 30, primary device 55, 60, or secondary device 65, 70). Also, one of the components, such as the secondary device 70, can issue a command to another component, such as the primary device 60. The destination of a particular command is governed by the address associated with the command. Because each component has a unique address space, the command can be steered throughout the system to the proper destination. The host bridge 45 and primary to secondary bridge 50 allow commands to be issued on one side of one of the buses 20, 35, 40 having a destination on the same or another bus 20, 35, 40.

Figure 2:
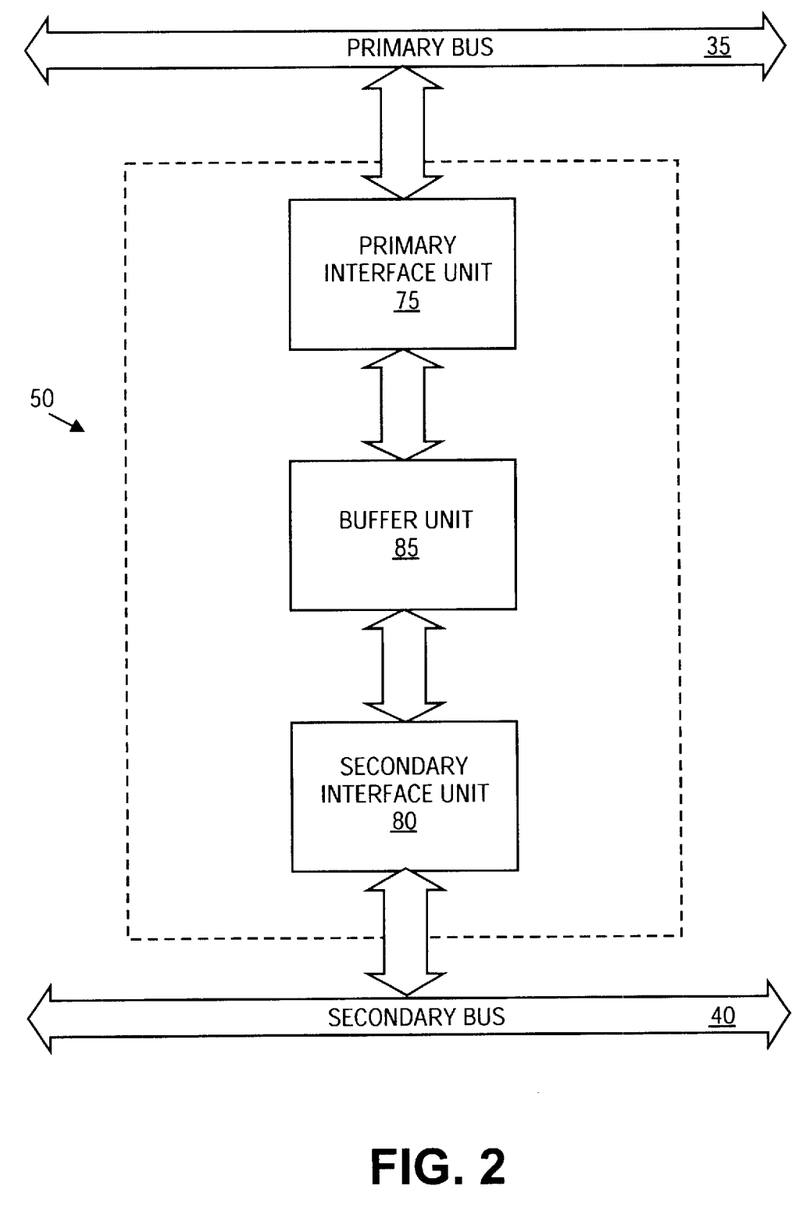
FIG. 2 is a block diagram of the primary to secondary bridge of FIG. 1.

Referring to FIG. 2, a simplified block diagram of the primary to secondary bridge 50 is shown. The invention is applicable to any bridge capable of posting transactions connecting any two buses. The use of the primary to secondary bridge 50 is for illustrative purposes. Hereinafter the primary to secondary bridge 50 will be referred to as the bridge 50. For ease and clarity of illustration, only those portions of the bridge 50 necessary for explanation of the invention are shown.

The bridge 50 includes a primary interface unit 75 coupled to the primary bus 35 and a secondary interface unit 80 coupled to the secondary bus 40. The bridge allows transactions to be completed in either direction, i.e., primary bus 35 to secondary bus 40 or secondary bus 40 to primary bus 35. A buffer unit 85 is coupled between the primary interface unit 75 and the secondary interface unit 80. The buffer unit 85 allows the buffering of posted transactions, such as posted writes. As described in greater detail below, the buffer unit 85 in the particular embodiment illustrated also includes a bypass path to allow non-buffered commands to propagate through the buffer unit 85. Although the invention is described with the respect to the buffering of posted writes, its application is not so limited. It is contemplated that future bus specifications and topologies may allow for buffering of other types of transactions, thus giving rise to potential deadlock scenarios other than those illustrated herein. The invention is applicable to any such buffered or posted transaction including, but not limited to, posted writes.

Figure 3:
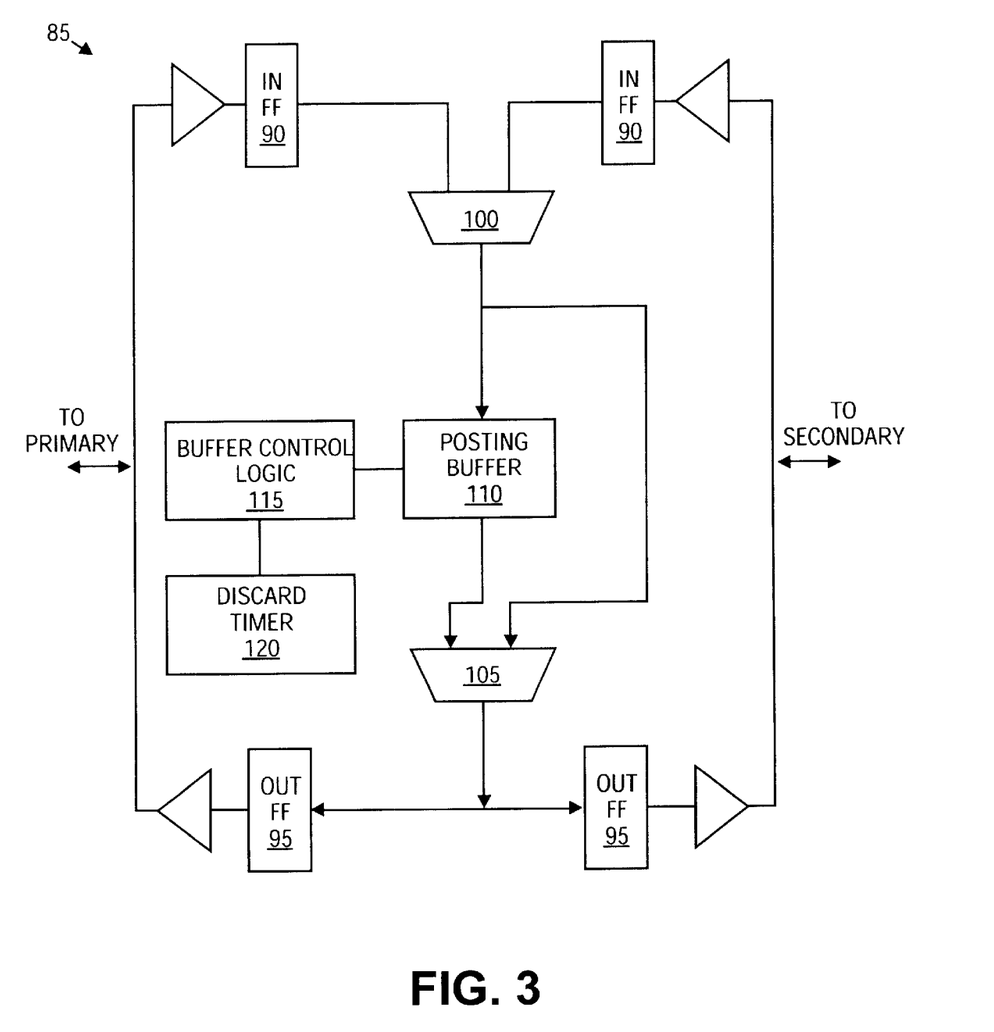
FIG. 3 is a block diagram of the buffer unit of FIG. 2.

Referring to FIG. 3, a block diagram of the buffer unit 85 in the particular embodiment of FIG. 2 is provided. The buffer unit 85 includes "in" flip flops 90 and "out" flip flops 95 for latching commands and data being transferred between the respective primary and secondary interface units 75, 80. An input multiplexer 100 selects between the in flip flop 90 associated with the primary interface unit 75 and the in flip flop 90 associated with the secondary interface unit 80 depending on the direction of the transaction. A bypass multiplexer 105 allows the output of the input multiplexer 100 to pass to a posting buffer 110 or to be bypassed around the posting buffer 110. The output of the bypass multiplexer 105 is delivered to the respective out flip flop 95, again depending on the direction of the transaction.

Buffer control logic 115 manages the posting buffer 110. In the illustrated embodiment, the posting buffer 110 is a six double word (DW) deep data buffer with corresponding byte enables for write posting. In the bridge 50 illustrated in FIG. 2, the posting buffer 110 shown in FIG. 3 also functions for buffering read prefetches. However, only one of the operations (i.e., write posting or read prefetching) can be performed at a time in this particular embodiment. The specifics on the posting buffer 110 are provided for exemplary purposes. The invention may be applied to a posting buffer 110 of varying sizes and constructions, depending on design and implementation requirements.

A discard timer 120 tracks the length of time posted data resides in the posting buffer 110. If posted data has remained in the posting buffer 110 after a predetermined time, it is likely that some sort of error has occurred in the target device (not shown). When the predetermined time expires, the buffer control logic 115 flushes the posting buffer 110 and an error signal is asserted to notify the computer system 10 that the failure has occurred. Flushing the posting buffer 110 allows other commands, such as read commands to be completed over the bridge 50, thus avoiding a deadlock scenario. In the context of a PCI implementation, the bridge 50 asserts a system error signal (SERR#) and sets a status bit corresponding to the discard timer expiration status to indicate the reason for the SERR# assertion. In response to the error, the device that had posted the write (not shown) can retry the request or take some other predetermined action.

Figure 4:
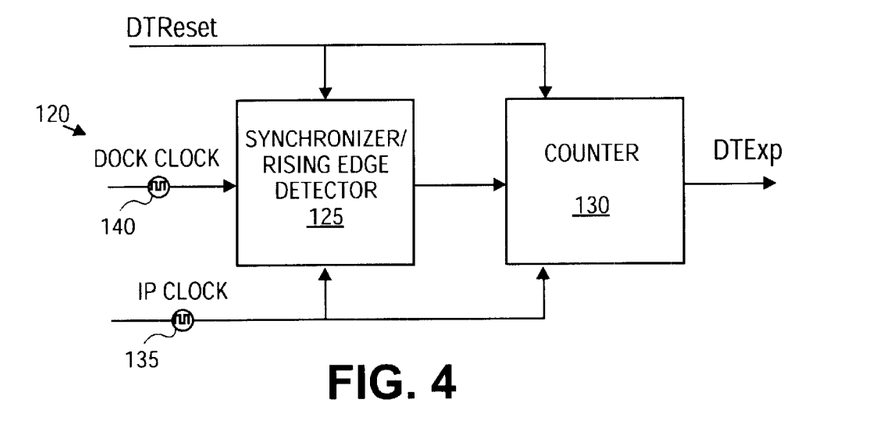
FIG. 4 is a block diagram of the discard timer of FIG. 3.

A block diagram of the discard timer 110 of FIG. 3 is provided in FIG. 4. The discard timer 120 includes a synchronizer/rising edge detector (SRED) 125 and a counter 130. The SRED 125 and counter 130 are described in greater detail in FIGS. 5 and 6, respectively.

Figure 5:
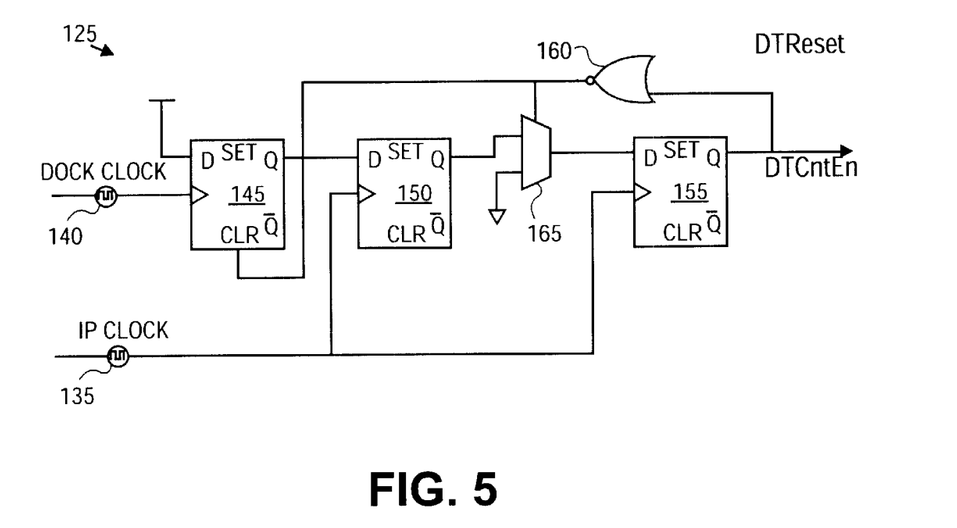
FIG. 5 is a block diagram of the synchronizing/rising edge detector of FIG. 4.

Referring to FIG. 5, the SRED 25 receives an IP clock 135, which in the illustrated embodiment is the 33 MHz master PCI clock, and a dock clock 140. The dock clock 140 is a 32 kHZ clock used to generate a timing signal for the discard timer 110. In the illustrated embodiment the dock clock 140 is asynchronous with the IP clock 135. The first flip flop 145 is an asynchronous flip flop triggered by the dock clock 140. The second and third flip flops 155 and 150 are triggered by the IP clock 135. When the dock clock 140 goes high, the first flip flop 145 is triggered and latches the rising edge. The second flip flop 150 latches the transition at the next IP clock 135 rising edge, thus synchronizing the dock clock 140 transition with the IP clock 135. One IP clock cycle later the third flip flop 155 provides a discard time counter enable ("DTCntEn") output. The DTCntEn signal is received by a NOR gate 160. The NOR gate 160 output toggles a multiplexer 165 to a grounded input, thus clearing the input to the third flip flop 155. On the next IP clock 135 cycle, the third flip flop 155 is cleared and the DTCntEn signal goes low. The output of the NOR gate 160 also clears the first flip flop 145. As a result, for each dock clock 140 transition, a single DTCntEn pulse is generated. The NOR gate 160 also receives a discard timer reset signal ("DTReset"), which is asserted by the buffer control logic 115 shown in FIG. 2 when no data is posted in the posting buffer 110. The DTReset signal prevents DTCntEn pulses when the posting buffer 110 is empty.

Figure 6:
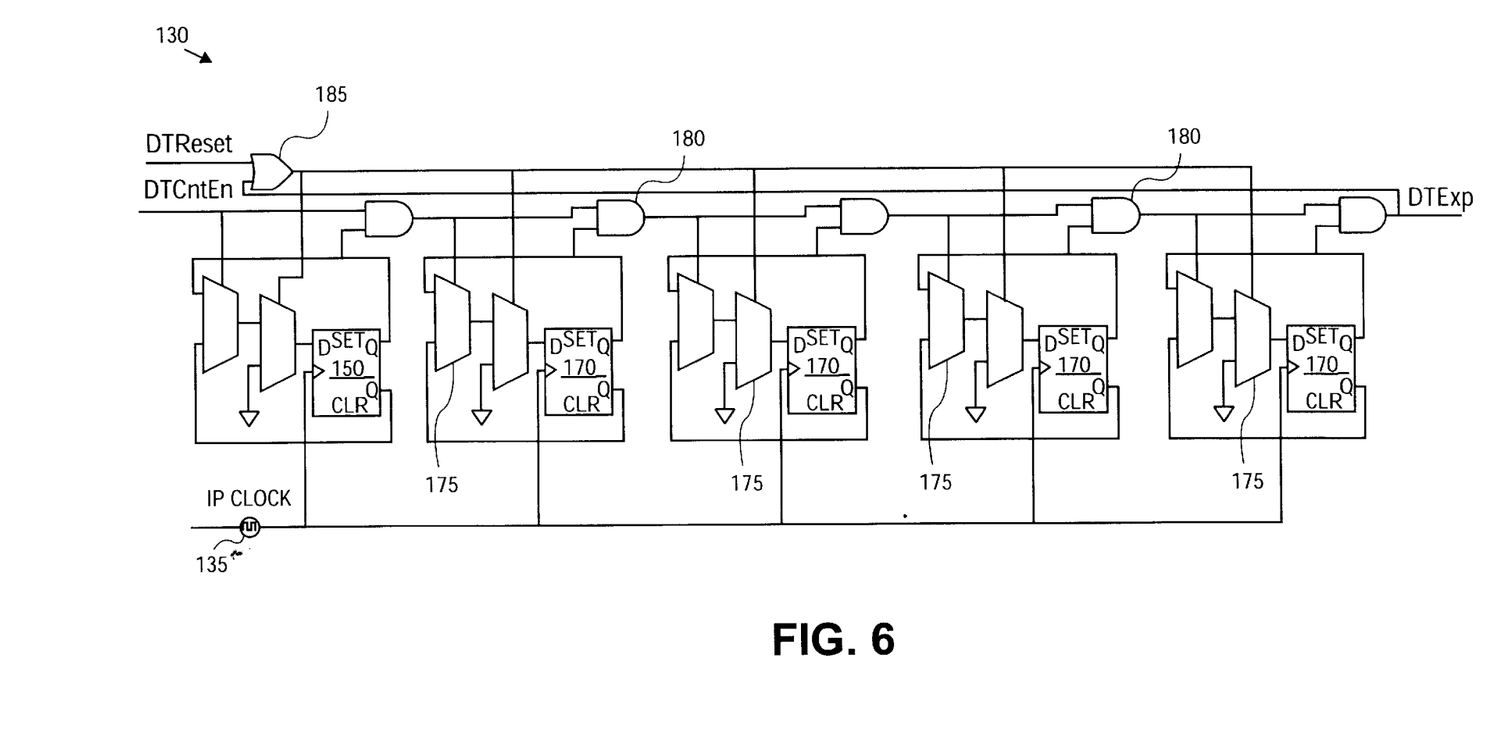
FIG. 6 is a block diagram of the counter of FIG. 4.

Turning now to FIG. 6, a block diagram of the counter 130 of FIG. 3 is shown. The counter 130 receives the IP clock 135, the DTReset signal, and the DTCntEn signal from the SRED 25. The cascaded arrangement of flip flops 170, logic multiplexers 175, and logic gates 180 for a 5-bit counter that provides a discard timer expired signal ("DTExp") when the counter receives its 32nd pulse of the DTCntEn signal. The DTExp signal signals that the posted data has been in the posting buffer 110 much longer than is typically necessary for completion of the posted writes. It is presumed that a deadlock has occurred due to some problem or error with the device that had been targeted (not shown) for the posted write. As described above, the bridge 50 of FIG. 2 flushes the posting buffer 110 and asserts an SERR# signal to signify the flush. The counter 130 is reset to 0 counts by an OR gate 185 when either the DTReset signal is asserted (i.e., the posting buffer 110 is empty) or when the DTExp signal is generated.

Figure 7:
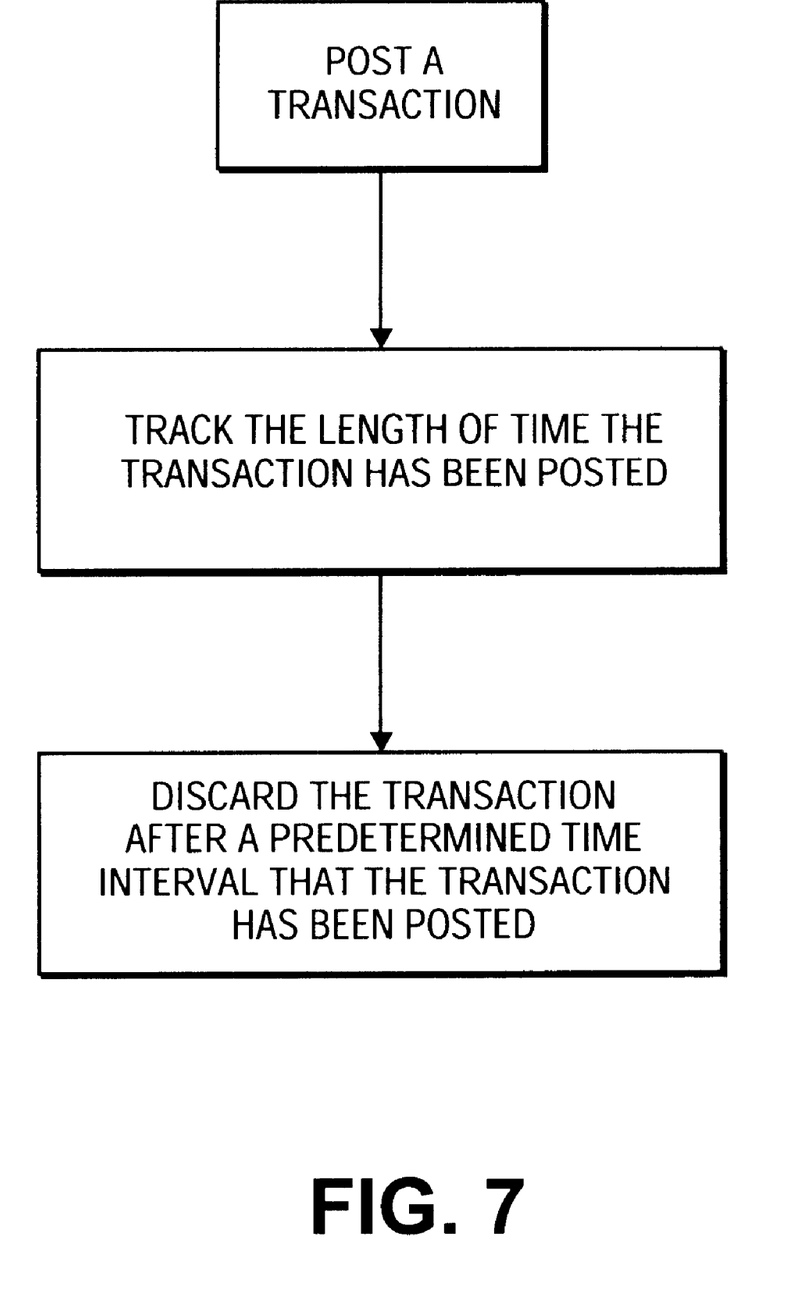
FIG. 7 is a flow diagram of a method for exiting from a potential deadlock situation in one embodiment of the present invention.

FIG. 7 illustrates a flow diagram of one embodiment of a method for exiting from a potential deadlock situation. The method includes posting a transaction. The length of time the transaction has been posted is tracked, and the transaction is discarded after a predetermined time interval that the transaction has been posted.

Figure 8:
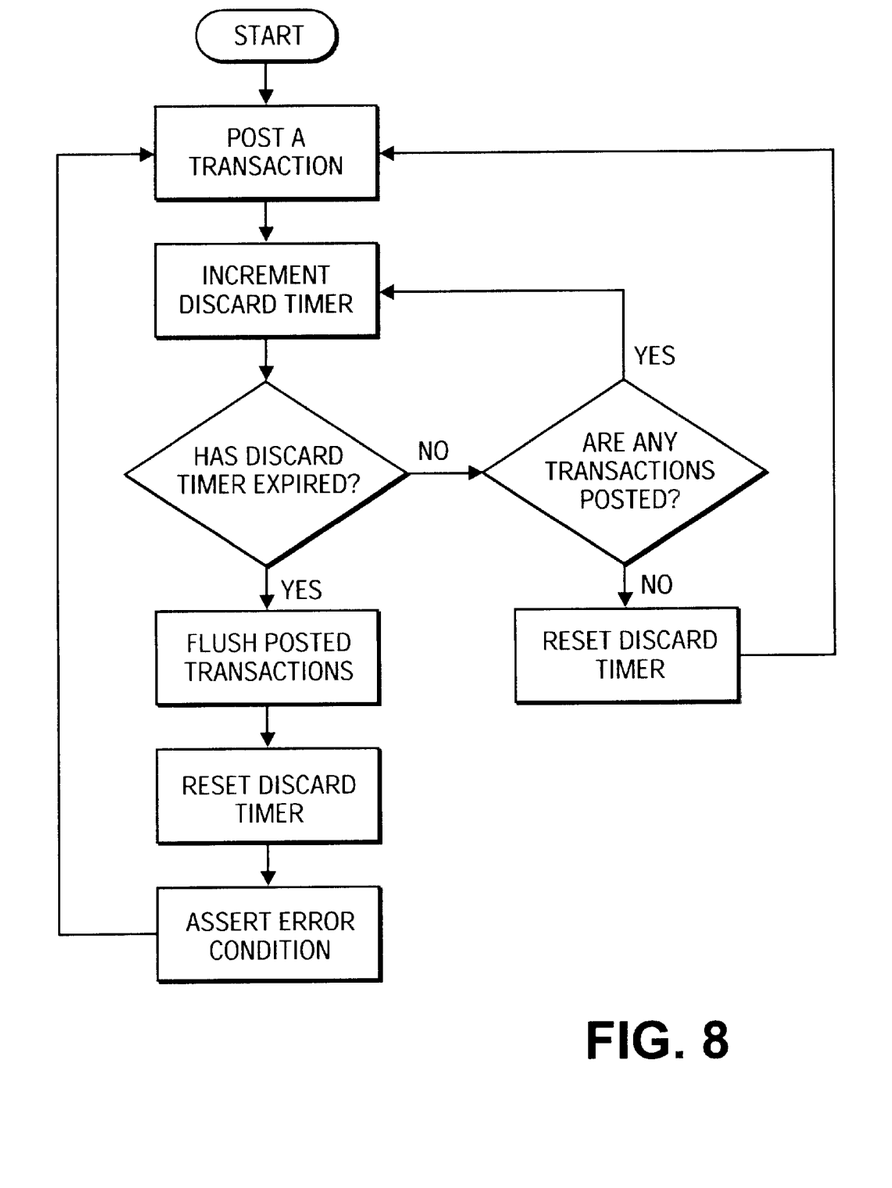
FIG. 8 is a flow diagram detailing the method of FIG. 7.

FIG. 8 illustrates a flow diagram of a particular embodiment of the method of FIG. 7 in greater detail. The method includes posting a transaction. The discard timer 120 of FIGS. 3–4 is incremented in response to the posted transaction. If the discard timer 120 has not expired and a posted transaction remains, the discard timer 120 continues to be incremented. If the posted transaction is completed, the discard timer 120 is reset. If the discard timer 120 expires, the posted transaction is flushed, the discard timer 120 is reset, and an error condition is asserted.

In the illustrated embodiment, the time interval corresponding to 32 pulses of the dock clock 140 shown in FIGS. 4–5 is approximately 1 millisecond or $2^{15}$ IP clock 135 cycles. This length of time is longer than is typically required for the completion of writes posted to the bridge 50 shown in FIG. 2. It is then reasonable to assume that a deadlock has occurred. The posting buffer 110 is flushed so that other commands, such as read commands, can be executed over the bridge 50 illustrated in FIG. 3. As discussed above, a common deadlock avoidance rule prevents reads from being conducted over a bridge 50 when write data is posted. Exiting from the deadlock scenario allows other transactions to be conducted. Assertion of the error signal, SERR#, allows appropriate error handlers to address the failed writes and recover from the deadlock without causing the entire computer system 10 to lock, thus requiring a complete reset. Although the discussion herein is directed to deadlocks caused by posted writes, other buffered commands may be implemented that may produce similar scenarios, and the invention may be applied to address these other scenarios.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A bridge for communicating between a first and second bus, comprising:
   a first interface unit coupled to the first bus;
   a second interface unit coupled to the second bus;
   a buffer unit coupled to the first and second interface units to receive a posted transaction from one of the first and second interface units, wherein the buffer unit includes a posting buffer to store the posted transaction and a discard timer to generate a discard time expired signal after a predetermined time interval that the posted transaction has resided in the posting buffer, the buffer unit to flush the posting buffer and to invalidate the posted transaction in response to the discard time expired signal to free the bridge for other non-posting transactions by removing a deadlock condition.

2. The bridge of claim 1, wherein the discard timer includes a counter to provide the discard timer expired signal when a predetermined counter value indicating the predetermined time interval has been reached.

3. The bridge of claim 2, wherein the discard timer includes a synchronizing edge detector to receive a first clock signal and a second clock signal, where the synchronizing edge detector detects a transition in the first clock signal and synchronizes the transition with the second clock signal to provide a counter enable signal.

4. The bridge of claim 3, wherein the transition in the first clock signal is a rising edge transition.

5. The bridge of claim 3, wherein the counter enable signal has a pulse corresponding to the transition.

6. The bridge of claim 3, wherein the counter is to receive the counter enable signal and increment the counter value in response to the counter enable signal.

7. The bridge of claim 3, wherein the counter is an N-bit counter and the predetermined counter value is $2^N$ counts.

8. The bridge of claim 2, further comprising buffer control logic to assert a discard timer reset signal when the posted transaction retires from the posting buffer, wherein the discard timer is to reset the counter in response to the discard timer reset signal.

9. The bridge of claim 1, further comprising buffer control logic to provide an error signal in response to the discard timer expired signal to at least the first or second interface units that provided the posted transaction to initiate a repost of the flushed posted transaction.

10. A computer system, comprising:

at least a first and a second bus; and a bridge coupled between the first and second buses, wherein the bridge is to receive and store a posted transaction from one of the first and second buses and generate a discard timer expired signal after a predetermined time interval that the posted transaction has resided in the bridge, the bridge including
(a) a first interface unit coupled to the first bus;
(b) a second interface unit coupled to the second bus; and
(c) a buffer unit coupled to the first and second interface units to receive the posted transaction from one of the first and second buses through respective one of the first and second interface units, wherein the buffer unit includes a posting buffer to store the posted transaction and a discard timer to generate a discard timer expired signal after a predetermined time interval that the posted transaction has resided in the posting buffer, the buffer unit to flush the posting buffer and to invalidate the posted transaction in response to the discard time expired signal to free the bridge for other non-posting transactions by removing a deadlock condition without resetting the computer system.

11. The computer system of claim 10, wherein the discard timer includes a counter to provide the discard timer expired signal when a predetermined counter value indicating the predetermined time interval has been reached.

12. The computer system of claim 11, where the discard timer includes a synchronizing edge detector to receive a first clock signal and a second clock signal, wherein the synchronizing edge detector detects a transition in the first clock signal and synchronizes the transition with the second clock signal to provide a counter enable signal.

13. The computer system of claim 12, wherein the transition in the first clock signal is a rising edge transition.

14. The computer system of claim 12, wherein the counter enable signal has a pulse corresponding to the transition.

15. The computer system of claim 12, wherein the counter is to receive the counter enable signal and increment the counter value in response to the counter enable signal.

16. The computer system of claim 12, wherein the counter is an N-bit counter, and the predetermined counter value is $2^N$ counts.

17. The computer system of claim 11, further comprising buffer control logic to assert a discard timer reset signal when the posted transaction retired from the posting buffer, wherein the discard timer is to reset the counter in response to the discard timer reset signal.

18. The computer system of claim 10, further comprising buffer control logic to provide an error signal in response to the discard timer expired signal to at least the first or second interface units that provide the posted transaction.

19. A method to exit from a deadlock situation, comprising:

posting a transaction to a bridge across two buses of a computer;

tracking the length of time the transaction has been posted to the bridge;

discarding the posted transaction after a predetermined time interval that the posted transaction has been posted by flushing a posting buffer holding the posted transaction to clear the deadlock situation without resetting the computer;

exiting the deadlock situation; and performing a non-posting transaction across the bridge.

20. The method of claim 19, further comprising asserting an error condition in response to the discarding.

21. The method of claim 20, wherein the tracking includes initializing a counter when the transaction is posted and incrementing the counter at predetermined counter intervals until the predetermined time interval is reached.

22. The method of claim 21, further comprising resetting the counter in response to discarding the transaction.

* * * * *